United States Patent
Sadak et al.

(10) Patent No.: US 10,481,856 B2
(45) Date of Patent: Nov. 19, 2019

(54) VOLUME ADJUSTMENT ON HINGED MULTI-SCREEN DEVICE

(71) Applicant: Microsoft Technology Licensing, LLC, Redmond, WA (US)

(72) Inventors: Christian Michael Sadak, Seattle, WA (US); Adolfo Hernandez Santisteban, Bothell, WA (US); Andrew Frederick Muehlhausen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 204 days.

(21) Appl. No.: 15/640,318

(22) Filed: Jun. 30, 2017

(65) Prior Publication Data

US 2018/0329672 A1 Nov. 15, 2018

Related U.S. Application Data

(60) Provisional application No. 62/506,538, filed on May 15, 2017.

(51) Int. Cl.
*G06F 3/16* (2006.01)
*G06F 3/01* (2006.01)
(Continued)

(52) U.S. Cl.
CPC ............ *G06F 3/165* (2013.01); *G06F 1/1605* (2013.01); *G06F 1/1618* (2013.01);
(Continued)

(58) Field of Classification Search
CPC ........ G06F 3/165; G06F 3/013; G06F 3/0487; G06F 1/1618; G06F 1/1649;
(Continued)

(56) References Cited

U.S. PATENT DOCUMENTS 8,854,447 B2 10/2014 Conness et al.
9,075,558 B2 * 7/2015 Reeves ................. G06F 3/1438
(Continued)

FOREIGN PATENT DOCUMENTS

EP 2738640 A2 6/2014
WO 2015195445 A1 12/2015

OTHER PUBLICATIONS

"International Search Report and Written Opinion Issued in PCT Application No. PCT/US2018/028734", dated Jul. 3, 2018, 15 Pages.
(Continued)

*Primary Examiner* — Lin Ye
*Assistant Examiner* — John H Morehead, III
(74) *Attorney, Agent, or Firm* — Alleman Hall Creasman & Tuttle LLP

(57) ABSTRACT

A mobile computing device including a housing having a first part and a second part, the first part including a first display and a first forward facing camera, and the second part including a second display and a second forward facing camera, at least one speaker mounted in the housing, and a processor mounted in the housing and configured to display a first graphical user interface element having an associated first audio stream on the first display and to display a second graphical user interface element having an associated second audio stream on the second display, wherein the processor is configured to perform face detection on a first and a second image, adjust an audio setting based on a result of the face detection, and play the first and second audio streams out of the at least one speaker based on the adjusted audio setting.

19 Claims, 9 Drawing Sheets

(51) Int. Cl.
*G06F 3/0487* (2013.01)
*G06F 1/16* (2006.01)
*H04M 1/02* (2006.01)
*H04M 1/60* (2006.01)
*H04M 1/725* (2006.01)

(52) U.S. Cl.
CPC .......... *G06F 1/1647* (2013.01); *G06F 1/1649* (2013.01); *G06F 1/1677* (2013.01); *G06F 1/1686* (2013.01); *G06F 1/1688* (2013.01); *G06F 3/013* (2013.01); *G06F 3/0487* (2013.01); *H04M 1/0216* (2013.01); *H04M 1/0243* (2013.01); *H04M 1/6008* (2013.01); *H04M 1/72569* (2013.01); *H04M 2250/52* (2013.01)

(58) Field of Classification Search
CPC .... G06F 1/1677; G06F 1/1605; G06F 1/1686; G06F 1/1688; G06F 1/1647; H04M 1/72569; H04M 1/0216; H04M 1/0243; H04M 1/6008; H04M 2250/52
See application file for complete search history.

(56) References Cited

U.S. PATENT DOCUMENTS

| | | | |
|---|---|---|---|
| 9,317,198 B2 | 4/2016 | Kwak et al. | |
| 9,342,147 B2 | 5/2016 | Wilairat et al. | |
| 9,507,418 B2 | 11/2016 | Yu et al. | |
| 9,588,668 B2 | 3/2017 | Selim | |
| 2005/0047629 A1 | 3/2005 | Farrell et al. | |
| 2009/0066798 A1* | 3/2009 | Oku | G03B 31/00 348/207.99 |
| 2010/0027832 A1* | 2/2010 | Koseki | H04R 1/323 381/387 |
| 2011/0069841 A1 | 3/2011 | Angeloff et al. | |
| 2012/0062729 A1* | 3/2012 | Hart | G06F 1/1626 348/135 |
| 2012/0262555 A1* | 10/2012 | Chien | H04N 21/44008 348/51 |
| 2013/0076679 A1 | 3/2013 | Kretz | |
| 2013/0259312 A1 | 10/2013 | Lyons et al. | |
| 2013/0293581 A1 | 11/2013 | Wissner-gross et al. | |
| 2013/0321340 A1* | 12/2013 | Seo | G06F 1/1641 345/174 |
| 2014/0064517 A1* | 3/2014 | Ko | H04R 3/04 381/98 |
| 2014/0098188 A1* | 4/2014 | Kwak | G06T 3/40 348/38 |
| 2014/0101578 A1* | 4/2014 | Kwak | G06F 3/017 715/761 |
| 2014/0210740 A1* | 7/2014 | Lee | G06F 3/0488 345/173 |
| 2015/0058812 A1 | 2/2015 | Lindh et al. | |
| 2015/0130725 A1* | 5/2015 | Knepper | G06F 1/1643 345/173 |
| 2015/0220299 A1* | 8/2015 | Kim | G06F 3/0488 345/1.3 |
| 2015/0244940 A1* | 8/2015 | Lombardi | H04N 5/23293 348/333.06 |
| 2015/0309569 A1 | 10/2015 | Kohlhoff et al. | |
| 2015/0324002 A1 | 11/2015 | Quiet et al. | |
| 2016/0283781 A1* | 9/2016 | Kurakane | H04N 7/18 |
| 2016/0313967 A1* | 10/2016 | Han | G06F 3/1446 |
| 2017/0220307 A1* | 8/2017 | Da Silva Ramos | G06F 1/1647 |
| 2018/0329461 A1* | 11/2018 | Hernandez Santisteban | G06F 1/1681 |

OTHER PUBLICATIONS

Vincent, James, "Samsung is reportedly testing a dual-screen smartphone prototype", https://www.theverge.com/circuitbreaker/2017/4/12/15269410/samsung-dual-screen-prototype-phone, Published on: Apr. 12, 2017, 3 pages.

"The new Tobii Dynavox Windows Control", https://www.tobiidynavox.com/sv/software/windows-mjukvara/windows-control-sofware/?MarketPopupClicked=true, Retrieved on: May 10, 2017, 3 pages.

* cited by examiner

VOLUME ADJUSTMENT ON HINGED MULTI-SCREEN DEVICE

CROSS REFERENCE TO RELATED APPLICATIONS

This application claims priority to U.S. Provisional Patent Application No. 62/506,538, filed on May 15, 2017, the entirety of which is hereby incorporated herein by reference.

BACKGROUND

Users interact with multi-screen mobile devices throughout a variety of positions, including holding the device vertically, holding the device with a primary screen facing toward the user, holding the screen with a second screen facing toward the user, and other positions and orientations. When viewing content on the screens in these varying positions, users may encounter challenges adjusting the audio volumes of different applications executed on each of the screens, or different audio-enabled graphical user elements displayed on each of the screens.

SUMMARY

To address the above issues, a mobile computing device is provided. The mobile computing device may include a housing having a first part and a second part, the first part including a first display and a first forward facing camera, and the second part including a second display and a second forward facing camera, wherein the first part and the second part are coupled by a hinge configured to permit the first and second displays to rotate between angular orientations from a face-to-face angular orientation to a back-to-back angular orientation, a sensor mounted in the housing and configured to measure a relative angular displacement between the first and second parts of the housing, at least one speaker mounted in the housing, and a processor mounted in the housing and configured to display a first graphical user interface element having an associated first audio stream on the first display and to display a second graphical user interface element having an associated second audio stream on the second display, wherein the first and second forward facing cameras are configured to capture respective first and second images, and the processor is configured to perform face detection on the first and second images, adjust an audio setting based on a result of the face detection, and play the first and second audio streams out of the at least one speaker based on the adjusted audio setting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, conventional methods for volume adjustment of multiple applications or other content displayed on different screens of a multi-screen mobile computing device may be cumbersome and inconvenient for users of such mobile computing devices. The systems and methods described herein have been devised to address these challenges.

Figure 1:
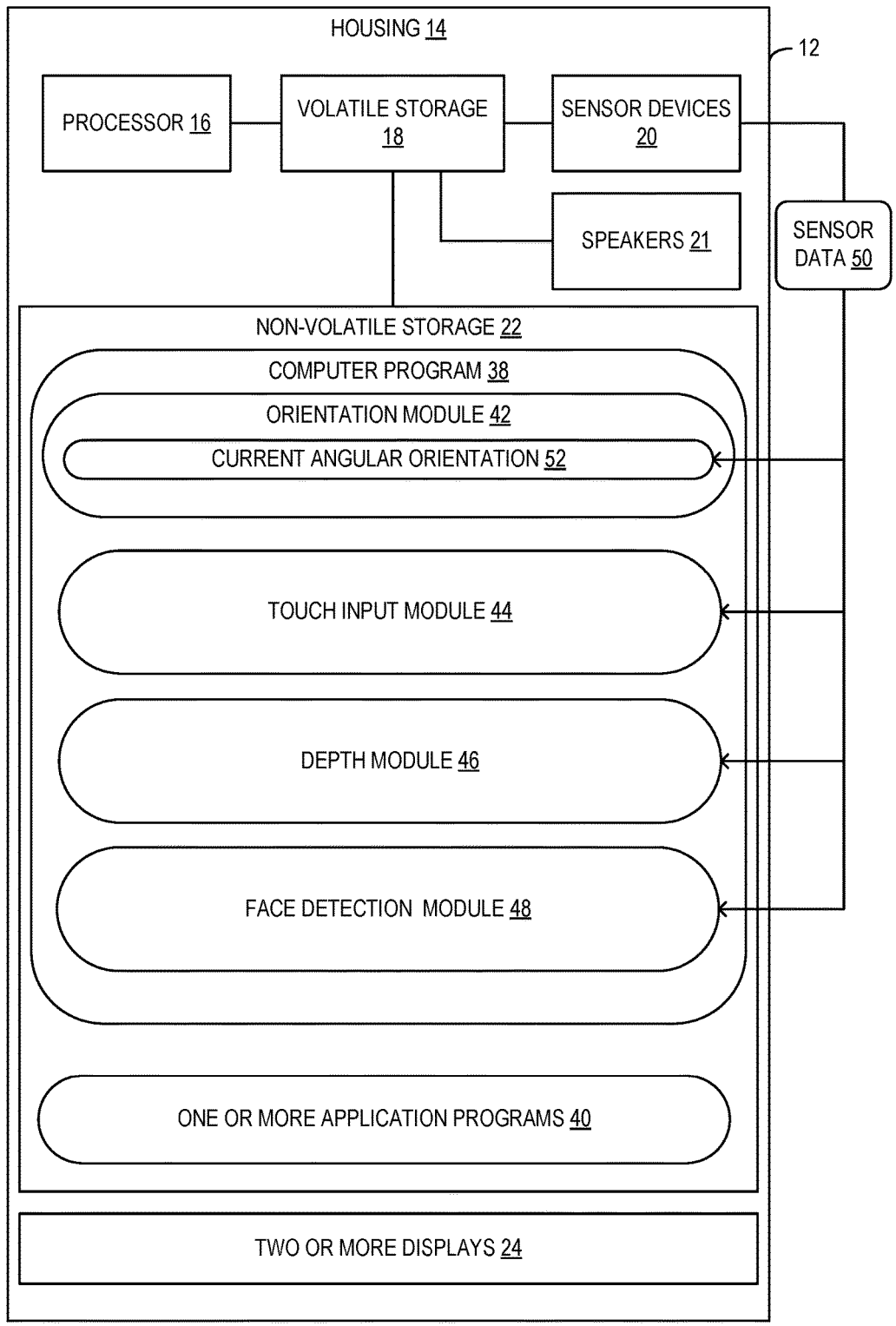
FIG. 1 shows an example mobile computing device of the present description.

FIG. 1 illustrates a mobile computing device 12 that includes a housing 14, which, for example, may take the form of a casing surrounding internal electronics and providing structure for displays, sensors, speakers, buttons, etc. The housing 14 is configured to include a processor 16, volatile storage device 18, sensor devices 20, non-volatile storage device 22, one or more speakers 21, and at least two displays 24.

The mobile computing device 12 may, for example, take the form of a smart phone device. In another example, the mobile computing device 12 may take other suitable forms, such as a tablet computing device, a wrist mounted computing device, etc.

Figure 2A:
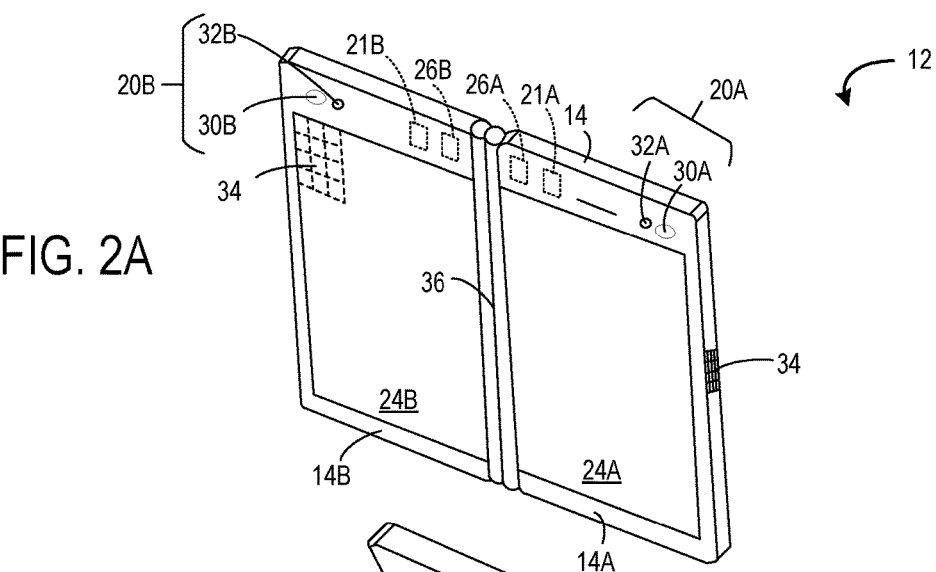
FIG. 2A shows an example of two display screens arranged in a side-by-side orientation for the mobile computing device of FIG. 1.

Turning to FIG. 2A, an example mobile computing device 12 is illustrated. As shown, the example mobile computing device 12 includes a housing 14. As discussed above, the housing 14 may be configured to internally house various electronic components of the example mobile computing device 12, including the processor 16, volatile storage device 18, and non-volatile storage device 22. Additionally, the housing 14 may provide structural support for the displays 24, speakers 21, and the sensor devices 20. The sensor devices 20 may include a plurality of different sensors, such as, for example, inertial measurement units (IMU) 26A and 26B, forward facing cameras 30A and 30B, depth cameras 32A and 32B, etc. The cameras are not particularly limited and may comprise a time of flight (TOF) three-dimensional camera, a stereoscopic camera, and/or picture cameras. The IMUs 26A and 26B may include accelerometers, gyroscopes, and possibly magnetometers configured to measure the position of the mobile computing device 12 in six degrees of freedom, namely x, y, z, pitch, roll, and yaw, as well as accelerations and rotational velocities, so as to track the rotational and translational motion of the mobile computing device 12. The sensor devices 20 may also include a capacitive touch sensor 34, such as a capacitive array that is integrated with each of the two or more displays 24, such as the first display 24A and the second display 24B. In another example, the sensor devices 20 may include camera-in-pixel sensors that are integrated with each of the two or more displays 24. It will be appreciated that the examples listed above are exemplary, and that other types of sensors not specifically mentioned above may also be included in the sensor devices 20 of the mobile computing device 12. In the illustrated example, the sensor devices 20 include two or more IMUs 26A and 26B that are contained by the housing 14. The sensor devices 20 may further include forward facing cameras 30A and 30B. In one example, the forward facing cameras 30A and 30B include RGB cameras. However, it will be appreciated that other types of cameras may also be included in the forward facing cameras 30A and 30B. In this example, forward facing is a direction of the camera's associated displays. Thus, in the example of FIG. 2A, as the screens for both of an example pair of displays 24A and 24B are facing the same direction, both of the forward facing cameras 30A and 30B are also facing the same direction. The sensor devices 20 further include depth cameras 32A and 32B.

As shown, the sensor devices 20 may also include capacitive touch sensors 34 that are integrated with the pair of displays 24A and 24B. Although a pair of displays is illustrated, a larger number of displays may be hingedly linked together. In the illustrated embodiment, the capacitive touch sensors 34 include a capacitive grid configured to sense changes in capacitance caused by objects on or near the displays, such as a user's finger, hand, stylus, etc. In one embodiment, the capacitive touch sensors 34 may also be included on one or more sides of the mobile computing device 12. For example, the capacitive touch sensors 34 may be additionally integrated into the sides of the housing 14 of the mobile computing device 12. While the capacitive touch sensors 34 are illustrated in a capacitive grid configuration, it will be appreciated that other types of capacitive touch sensors and configurations may also be used, such as, for example, a capacitive diamond configuration. In other examples, the sensor devices 20 may include camera-in-pixel devices integrated with each display including the pair of displays 24A and 24B. It will be appreciated that the sensor devices 20 may include other sensors not illustrated in FIG. 2A.

In the example mobile computing device 12 illustrated in FIG. 2A, the first and second displays 24A and 24B are movable relative to each other. As shown, the example mobile computing device 12 includes a housing 14 having a first part 14A and a second part 14B, the first part 14A including a first display 24A, a first forward facing camera 30A, and a first speaker 21A, and the second part 14B including a second display 24B, a second forward facing camera 30B, and a second speaker 21B. The first part 14A and the second part 14B are coupled by a hinge 36 configured to permit the first and second displays 24A and 24B to rotate between angular orientations from a face-to-face angular orientation to a back-to-back angular orientation. Likewise, the housing 14 includes the hinge 36 between a pair of speakers 21A and 21B, the hinge 36 being configured to permit the pair of speakers 21A and 21B to rotate between angular rotations from face-to-face angular orientation to a back-to-back angular orientation. The speakers 21A and 21B convert electrical signals to human-audible sound waves via audio circuitry that converts received electrical signals into audio data. It will be appreciated that each of the speakers 21A and 21B may comprise one speaker or a plurality of speakers that function together as a unit. The example mobile computing device 12 further includes sensors mounted in the housing 14 that are configured to measure a relative angular displacement between the first and second parts 14A and 14B of the housing 14. For example, the processor 16 may be configured to calculate the relative angular displacement between the first and second parts 14A and 14B of the housing 14 based on sensor data 50 received from the IMUs 26A and 26B.

Figure 2B:
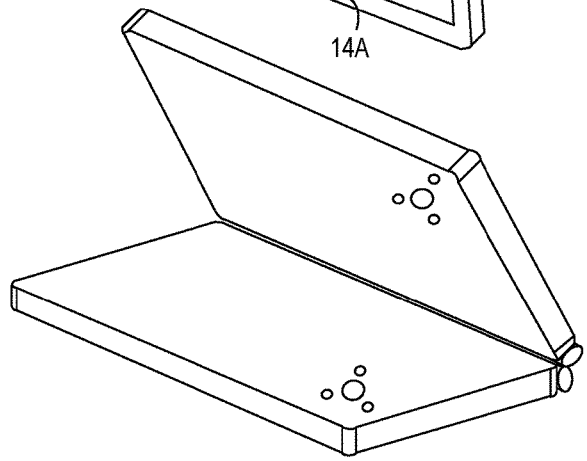
FIG. 2B shows an example of two display screens arranged in a reflex orientation for the mobile computing device of FIG. 1.

Now turning to FIG. 2B, the hinge 36 permits the first and second displays 24A and 24B to rotate relative to one another such that an angle between the first and second displays 24A and 24B can be decreased or increased by the user applying suitable force to the housing 14 of the mobile computing device 12. As shown in FIG. 2B, the first and second displays 24A and 24B may be rotated until the first and second displays 24A and 24B reach a back-to-back angular orientation as shown in FIG. 2C.

Figures 2C, 2D:
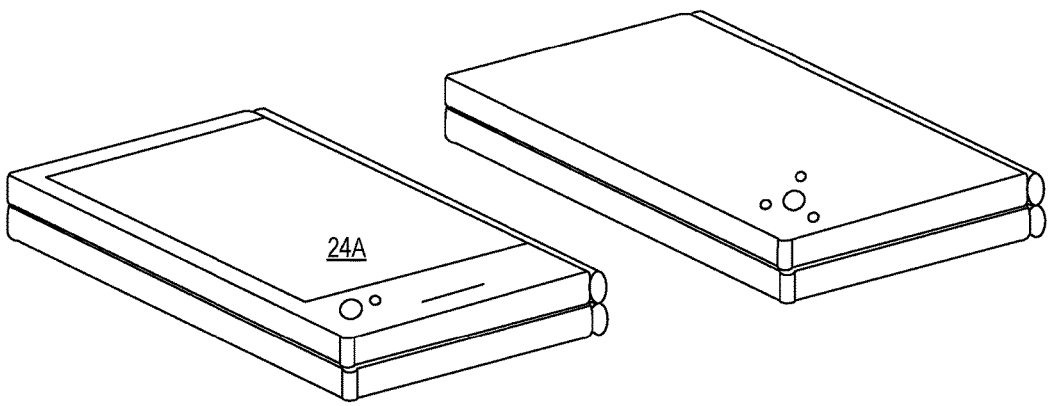
FIG. 2C shows an example of two display screens arranged in a back-to-back orientation for the mobile computing device of FIG. 1.
FIG. 2D shows an example of two display screens arranged in a front-to-front orientation for the mobile computing device of FIG. 1.

As illustrated in FIG. 2C, while in an angular orientation where the first and second displays 24A and 24B are in a back-to-back angular orientation, the first and second displays 24A and 24B face away from each other. Thus, while using the mobile computing device 12, the user may only be able to view one of the displays of the pair of displays 24A and 24B at a time. Additionally, while in a back-to-back angular orientation, sensor packages 20A and 20B of the sensor devices 20, which may each include forward facing cameras 30A and 30B, and depth cameras 32A and 32B, also face in the same direction as their respective displays, and thus also face away from each other.

As shown in FIG. 2D, the angular orientation between the pair of displays 24A and 24B may also rotate to a face-to-face orientation where the pair of displays face each other. Such an angular orientation may help protect the screens of the display.

In one implementation, the face-to-face angular orientation is defined to have an angular displacement as measured from display to display of between 0-90 degrees, an open angular orientation is defined to be between 90-270 degrees, and a back-to-back orientation is defined to be from 270-360 degrees. Alternatively, an implementation in which the open orientation is not used to trigger behavior may be provided, and in this implementation, the face-to-face angular orientation may be defined to be between 0 and 180 degrees and the back-to-back angular orientation may be defined to be between 180 and 360 degrees. In either of these implementations, when tighter ranges are desired, the face-to-face angular orientation may be defined to be between 0 and 60 degrees, or more narrowly to be between 0 and 30 degrees, and the back-to-back angular orientation may be defined to be between 300-360 degrees, or more narrowly to be 330-360 degrees. The zero degree position may be referred to as fully closed in the fully face-to-face angular orientation and the 360 degree position may be referred to as fully open in the back-to-back angular orientation. In implementations that do not use a double hinge and which are not able to rotate a full 360 degrees, fully open and/or fully closed may be greater than zero degrees and less than 360 degrees.

Turning back to FIG. 1, the processor 16 is configured to execute a computer program 38, which, for example, may be an operating system or control program for the mobile computing device, and one or more application programs 40 stored on the non-volatile storage device 22, and to enact various control processes described herein. In some examples, the processor 16, volatile storage device 18, and non-volatile storage device 22 are included in a System-On-Chip configuration.

The computer program 38 executed by the processor 16 includes an orientation module 42, a touch input module 44, a depth module 46, and a face detection module 48. As shown in FIG. 1, the orientation module 42 is configured to receive sensor data 50 from the sensor devices 20. Based on the sensor data 50, the orientation module 42 is configured to detect a current angular orientation 52 between the pair of displays 24A and 24B indicating that the pair of displays 24A and 24B are facing away from each other. As discussed previously, the angular orientation between the pair of displays 24A and 24B may rotate through angular orientations between a face-to-face angular orientation to a back-to-back angular orientation. Thus, the orientation module 42 is configured to detect a current angular orientation 52 indicating that the pair of displays 24A and 24B are facing away from each other, such as a back-to-back angular orientation. The touch input module is configured to process touch inputs, which may be inputs from a digit of a user or from a stylus.

The orientation module 42 may be configured to detect the current angular orientation 52 based on different types of sensor data. In one example, the sensor data 50 may include inertial measurement unit data received via the IMUs 26A and 26B. As the user applies force to the housing 14 of the mobile computing device 12 to rotate the pair of displays 24A and 24B, the IMUs 26A and 26B will detect the resulting movement. Thus, based on inertial measurement unit data for a new rotation and a previously known angular orientation between the pair of the displays 24A and 24B, the orientation module 42 may calculate a new current angular orientation 52 resulting after the user rotates the pair of displays 24A and 24B. However, it will be appreciated that the current angular orientation 52 may also be calculated via other suitable methods. For example, the sensor devices 20 may further include a hinge sensor in the hinge 36 that is configured to detect an angular orientation of the hinge 36, and thereby detect a current angular orientation of the pair of displays 24A and 24B around the pivot which is the hinge 36. In this embodiment, the hinge sensor is incorporated within the hinge 36 itself. However, it will be appreciated that the hinge sensor may alternatively be provided outside of the hinge 36.

Figure 3:
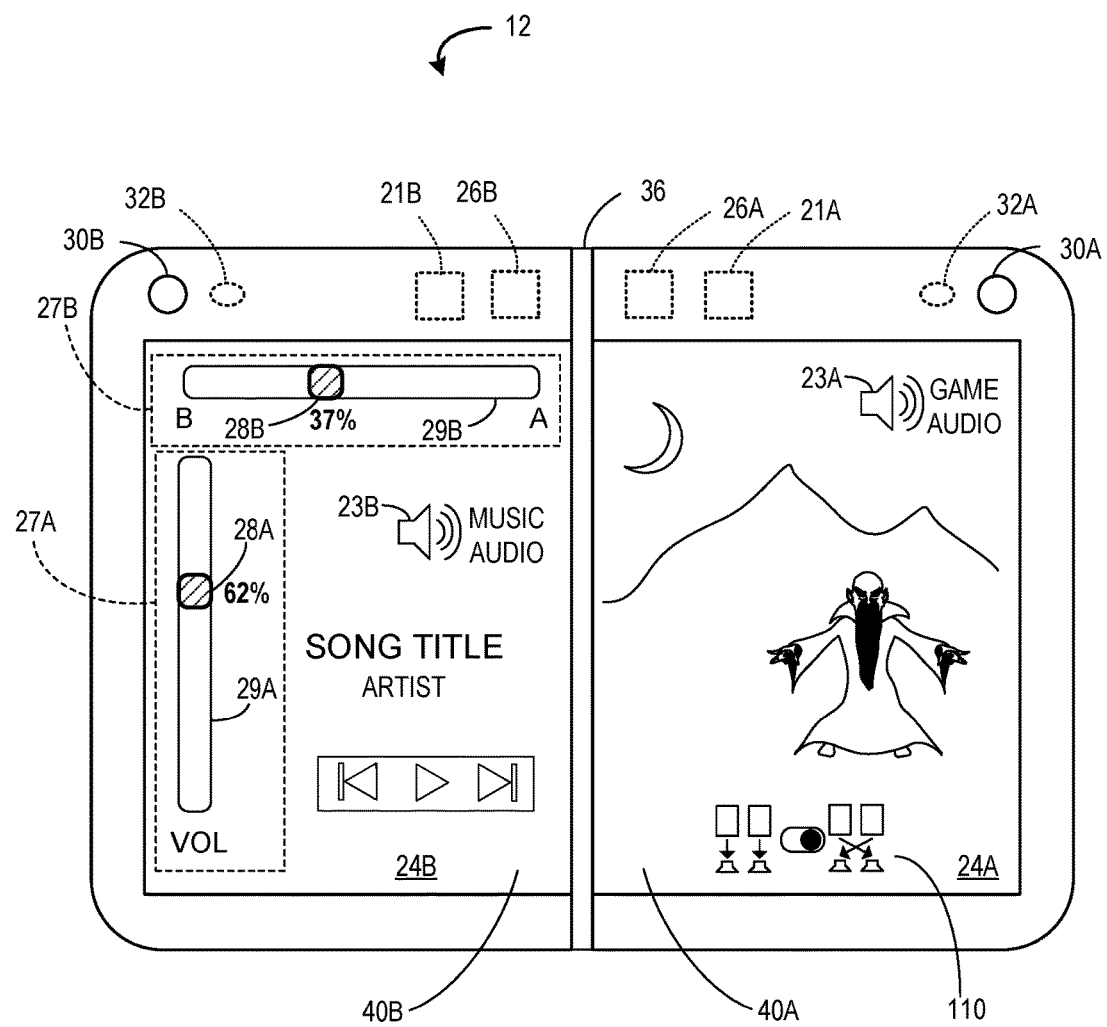
FIG. 3 shows an example implementation of GUI controls for adjusting audio parameters of the mobile computing device of FIG. 1.

With reference to FIG. 3, an example use illustrating aspects of the present disclosure will now be presented. As shown in FIG. 3, a user may be interacting with two different applications on the multi-screen computing device 12. As shown, the processor 16 is configured to display a first graphical user interface element having an associated first audio stream 23A on the first display 24A and to display a second graphical user interface element having an associated second audio stream 23B on the second display 24B. In the illustrated example, the second graphical user interface element is a music application 40B that is being displayed on the left display and outputting audio of the second audio stream 23B, while the first graphical user interface element is a game application 40A that is being displayed on the right display, outputting audio of the first audio stream 23A. In this example, the first display 24A and first speaker 21A are referred to as the right display and right speaker, while the second display 24B and second speaker 21B are referred to as the left display and the left speaker. Additionally, it will be appreciated that while the illustrated example shows the first graphical user interface element 40A and the second graphical user interface element 40B as being two different applications, the first and second graphical user interface elements 40A and 40B may be included in a single application that is being displayed across both the first and second displays 24A and 24B.

In the example illustrated in FIG. 3, a first graphical user interface (GUI) control 27A and a second GUI control 27B are displayed on the left display 24B. However, it will be appreciated that the placement of the user interface controls 27A and 27B on the displays 24A and 24B is not particularly limited, and the two user interfaces 27A and 27B may be placed independently at various locations on the displays 24A and 24B in any orientation (vertical or horizontal, parallel or perpendicular to each other, sized to overlap both displays).

In this example, each GUI control 27A and 27B is displayed as a slider control on either or both of the displays 24A and 24B by a computer program 38 (see FIG. 1). The GUI control 27A is touched and manipulated by a user to adjust an audio setting for an overall audio volume setting for the first and second audio streams 23A and 23B of the first and second graphical user interface elements, which, in this specific example, are included in application 40B executed on the left display 24B (hereinafter referred to as the left application 40B) and the application 40A executed on the right display 24A (hereinafter referred to as the right application 40A). A user adjusts the first GUI control 27A by touching the handle 28A and sliding it upward or downward (i.e. utilizing a touch-and-drag motion), so that the program 38 adjusts the overall volumes of the audio outputted by both the left application 40B and the right application 40A so that the user perceives the volumes of the audio output of both speakers 21A and 21B as increasing or decreasing in tandem with equal magnitude.

The second GUI control 27B is touched and manipulated by the user to an audio setting for a volume balance setting that controls the proportional mix of audio between the first and second audio streams 23A and 23B of the first and second graphical user interfaces element, which, in this specific example, are included in the left application 40B and the right application 40A. The user adjusts the second GUI control 27B by touching the handle 28B and sliding it to the left or right (i.e. utilizing a touch-and-drag motion), thereby altering the volume balance of the two applications 40A, 40B to achieve a desired sound mix. For example, if the handle 28B is actuated to be closer to the left end of the second control bar 29B than the right end, then the left application 40B outputs audio at a volume that is perceived by the user to be at a correspondingly higher decibel level than the volume of the audio outputted by the right application 40A. Conversely, if the GUI control 27B is actuated by a user providing a touch input to handle 28B and sliding the handle 28B toward the right (A) side in FIG. 3, the system will cause the right application 40A to output audio at a volume that is perceived by the user to be at a correspondingly higher decibel level than the volume of the audio outputted by the left application 40B. Additionally, if the user slides the handle 28B all the way to the right of the control bar 29B, the volume of the audio outputted by the left application 40B may be reduced to zero or a residual volume, while the volume of the audio outputted by the right application 40A may remain audible. Conversely, if the user slides the handle 28B all the way to the left of the control bar 29B, the volume of the audio from the right application 40A may be reduced to zero or a residual volume, while the volume of the audio outputted by the left application 40B may remain audible.

Typically, the audio is mixed into a stereo signal and emitted from speakers 21A, 21B as stereo audio. Alternatively, the audio may be mixed to a monoaural signal emitted both speakers 21A, 21B, and in yet another implementation, the application 40A may emit its audio from speaker 21A and application 40B may emit its audio from speaker 21B. Further, it will be appreciated that instead of applications 40A, 40B, different graphical user interface elements of the same application, each having associated audio, may be similarly displayed on each of displays 24A, 24B and the audio of each graphical user interface element controlled using the methods described herein. Additionally, it will be appreciated that the user may enter input to actuate the GUI controls 27A and 27B via other suitable methods. For example, the user may enter input to the GUI controls 27A and 27B via a stylus, another input device such as a computer mouse, a physical button, a voice input, a gesture input, or any other suitable type of input.

On the first display (right display) 24A an audio mix control 110 is displayed. The audio mix control is configured to receive a user input selecting between a parallel output mode and a mixed output mode. In the parallel output mode, an audio stream from a graphical user interface element from application 40A (or a common application) displayed on the first display 24A is played back via first speaker 21A positioned in the first part of the housing which houses the first display 24A, and an audio stream from a graphical user interface element of application 40B (or the common application) displayed on the second display 24B is played back via speaker 21B positioned in the second part of the housing which houses the second display 24B. In the mixed output mode, the audio output from the graphical user interface elements of applications 40A, 40B (or a common application) displayed on both displays 24A, 24B are mixed and output as a mixed mono or stereo played back through both speakers 21A, 21B. The icon on the left side of the button selector indicates the mixed audio mode and the icon on the right side of the button selector of the audio mix control 110 indicates the parallel output mode. Thus, the mixed audio mode is shown as being selected.

In at least one configuration, the user may also tap a control bar (e.g. the first control bar 29A or the second control bar 29B) so that the handle immediately moves to that location. Each handle may include a numerical label that provides an indication of the relative location of that handle on the slider control bar. It will be appreciated that a handle refers to a pre-defined region of the GUI controls 27A, 27B on the displays 24A and 24B that is grabbable by a user to adjust the value of the GUI control. Further, it will be appreciated that GUI controls 27A, 27B are illustrated as sliders, but alternatively may take the form of virtual knobs, text input boxes, or other control by which a user may adjust a parameter such as the volume balance and overall audio volume settings discussed herein.

Figure 4:
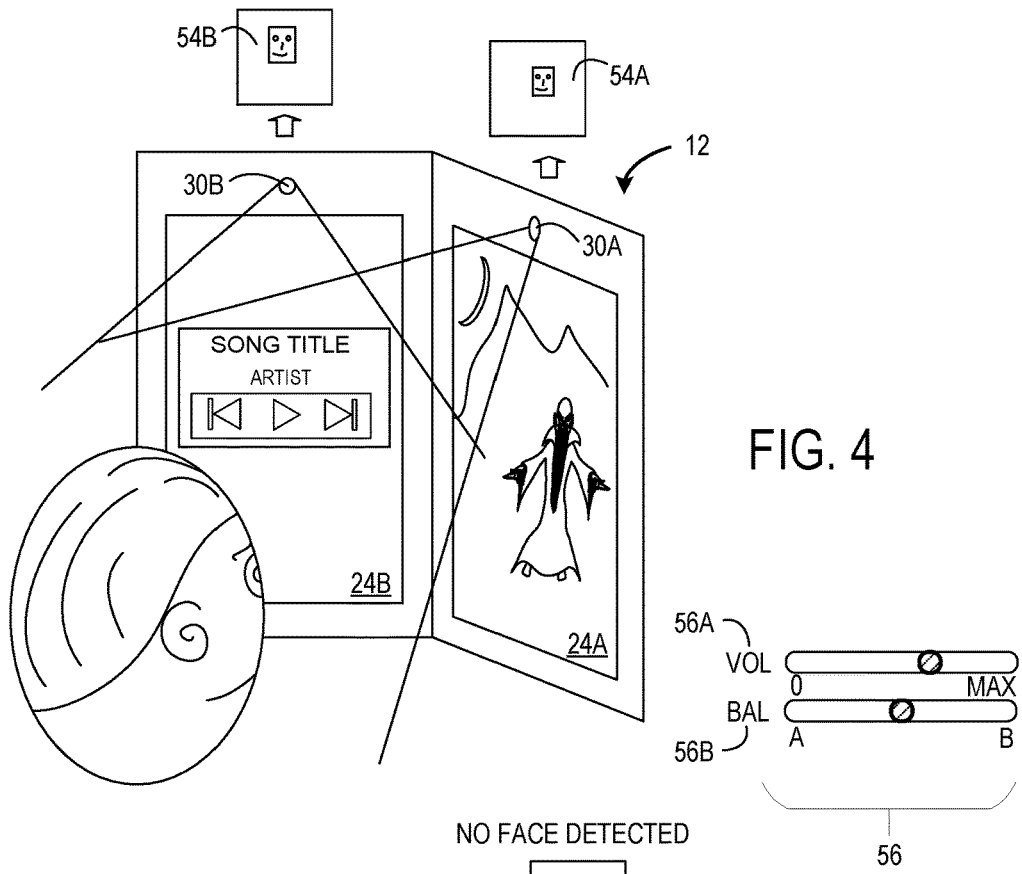
FIG. 4 is a schematic view illustrating adjustment of audio parameters based on facial detection, using the mobile computing device of FIG. 1.

Turning now to FIG. 4, the audio settings discussed above may be automatically adjusted by the processor 16 without user input via GUI controls 27A and 27B. In the illustrated example, the first and second forward facing cameras 30A and 30B are configured to capture respective first and second images 54A and 54B. In this example, the current angular orientation 52 between the first and second displays 24A and 24B is less than 180 degrees, thus both the first and second forward facing cameras 30A and 30B capture images of a scene in front of the mobile computing device 12. Thus, as the user is in front of the mobile computing device 12 and viewing the first and second displays 24A and 24B, the first and second forward facing cameras 30A and 30B capture first and second images 54A and 54B that include the user's face. The first and second images 54A and 54B are sent to the face detection module 48 of the computer program 38 in the sensor data 50. After receiving the first and second images 54A and 54B, the face detection module 48 executed by the processor 16 is configured to perform face detection on the first and second images 54A and 54B. In the illustrated example, the face detection module 48 detects the user's face in both the first and second images 54A and 54B.

Figure 5:
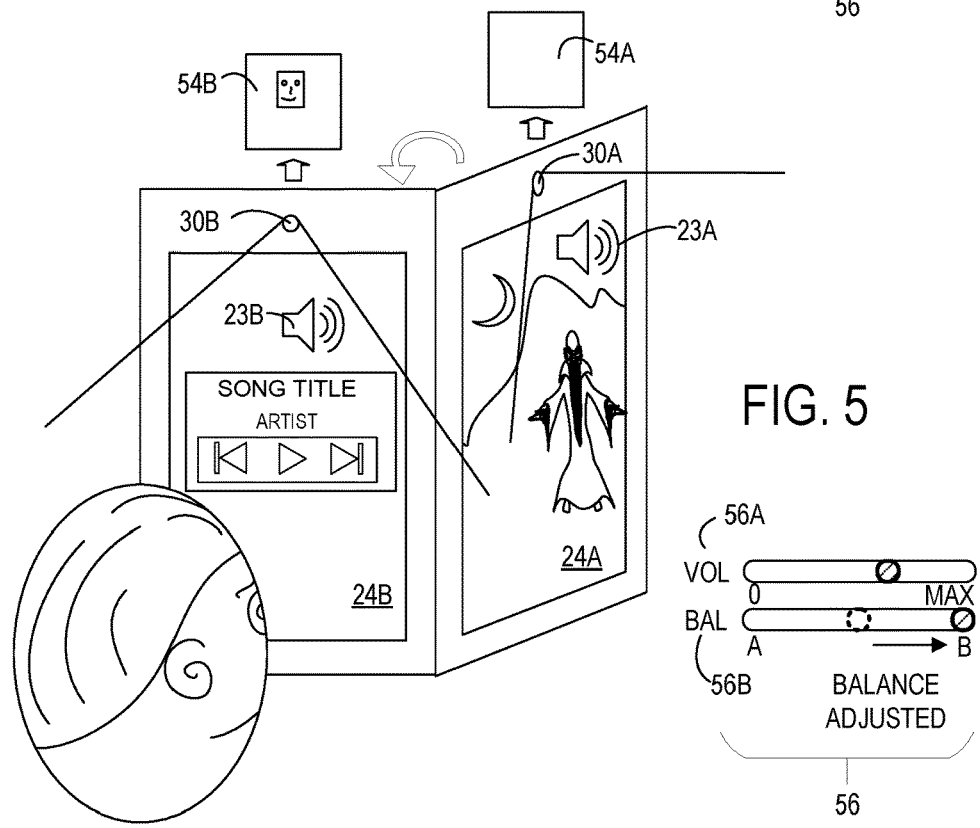
FIG. 5 is a schematic view illustrating adjustment of audio parameters based on facial detection and relative angular displacement between the first and second parts of the housing of the mobile computing device of FIG. 1.

FIG. 5 illustrates an example where the current angular orientation 52 between the first and second displays 24A and 24B is a reflex angle that is greater than 180 degrees. In this example, the first and second displays 24A and 24B do not face the same direction, and thus the first and second forward facing cameras 30A and 30B also do not face the same direction. Accordingly, the user may be viewing only one of the displays and thus may only be in front of one of the displays at a particular point in time. Similarly to FIG. 4, the first and second forward facing cameras 30A and 30B capture the first and second images 54A and 54B, which are both sent to the face detection module 48. However, in the example of FIG. 5, the first image 54A does not include the user's face, thus the face detection module 48 detects that no face was in the first image 54A. On the other hand, as the user was viewing the second display 30B at the particular point in time that the images were captured, the second image 54B does include the user's face, thus the face detection module 48 does detect the user's face in the second images 54B. Accordingly, in this example, the result of the face detection from the face detection module 48 includes no detected face in the first image 54A and a detected face in the second image 54B.

As shown in FIG. 5, the processor 16 may be further configured to dynamically adjust an audio setting 56 based on a result of the face detection. In one example, the processor 16 is configured to determine which display has a user focus based on the result of the face detection, and adjust the volume balance setting 56B to increase a relative volume of an audio stream associated with a user focused display. That is, the processor 16 is configured to determine which display of the first and second displays 24A and 24B the user is currently viewing, and adjust the volume balance such that the audio stream of the graphical user interface element presented on the display currently being viewed by the user has a higher volume relative to the audio stream of the graphical user interface element presented on the display that is not currently being viewed by the user. In the example of FIG. 5, the user is viewing the second display 24B, thus the processor 16 is configured to adjust the audio balance setting 56B such that the second audio stream 23B of the graphical user interface element shown on the second display 24B has an increased relative volume compared to the first audio stream 23A of the graphical user interface element shown on the first display 24A.

In one configuration, the processor 16 is configured to detect which display has user focus by determining that a relative angular displacement between the first and second displays 24A and 24B is greater than a predetermined threshold via the sensor. For example, processor 16 may be configured to detect whether the current angular orientation 52 has exceeded a predetermined threshold while the user applies rotational force that adjusts the relative angular displacement between the first and second displays 24A and 24B. In one example, the predetermined threshold is 180 degrees. As discussed above, when the current angular orientation 52, which is the relative angular displacement between the first and second displays 24A and 24B, is greater 180 degrees, then the first and second displays 24A and 24B do not face the same direction and the user may potentially only be able to view one of the displays at a time. However, it will be appreciated that other values may be used for the predetermined threshold to achieve a suitable sensitivity level. For example, the predetermined threshold may be 200 degrees, 240 degrees, 280 degrees, 360 degrees, or any other suitable predetermined threshold.

As the user may only be viewing and engaged with the content of one display and not the other when the current angular orientation 52 is greater than the predetermined threshold, the processor 16 is configured to adjust the audio settings to decrease the relative volume of the content that is no longer being viewed by the user. In one example, the processor 16 is configured to, responsive to determining that the relative angular displacement (current angular orientation 52) is greater than the predetermined threshold, decrease a relative volume of the display that is not the user focused display. The user focused display, which is the display that is current being viewed by the user, may be determined via any suitable method.

In one configuration, to determine which display has the user focus, the processor 16 is configured to determine whether the result of the face detection detected a face in the first image 54A captured by the first camera 30A and not in the second image 54B, and if so, then determine that the first display 24A is the user focused display. On the other hand, the processor 16 is further configured to determine whether the result of the face detection detected a face in the second image 54B captured by the second camera 30B and not in the first image 54A, and if so, then determine that the second display 24B is the user focused display. That is, if one of the images includes the user's face and the other does not, it is likely that the user is currently viewing and engaged with content of the display associated with that image including the user's face. In the example illustrated in FIG. 5, the result of the face detection from the face detection module 48 detected a face in the second image 54B captured by the second camera 30B and not in the first image 54A. Thus, the processor 16 determines that the second display 24B is the user focused display that is currently being viewed by the user. Accordingly, the processor 16 adjusts an audio setting 56, such as the audio balance setting 56B, based on the result of the face detection, and then plays the first and second audio streams 23A and 23B out of the first and second speakers 21A and 21B based on the adjusted audio setting. In the example of FIG. 5, the audio balance setting 56B was adjusted such that the second audio stream 24B is played at an increased relative volume compared to the first audio stream 24A out of the first and second speakers 21A and 21B.

Figure 6:
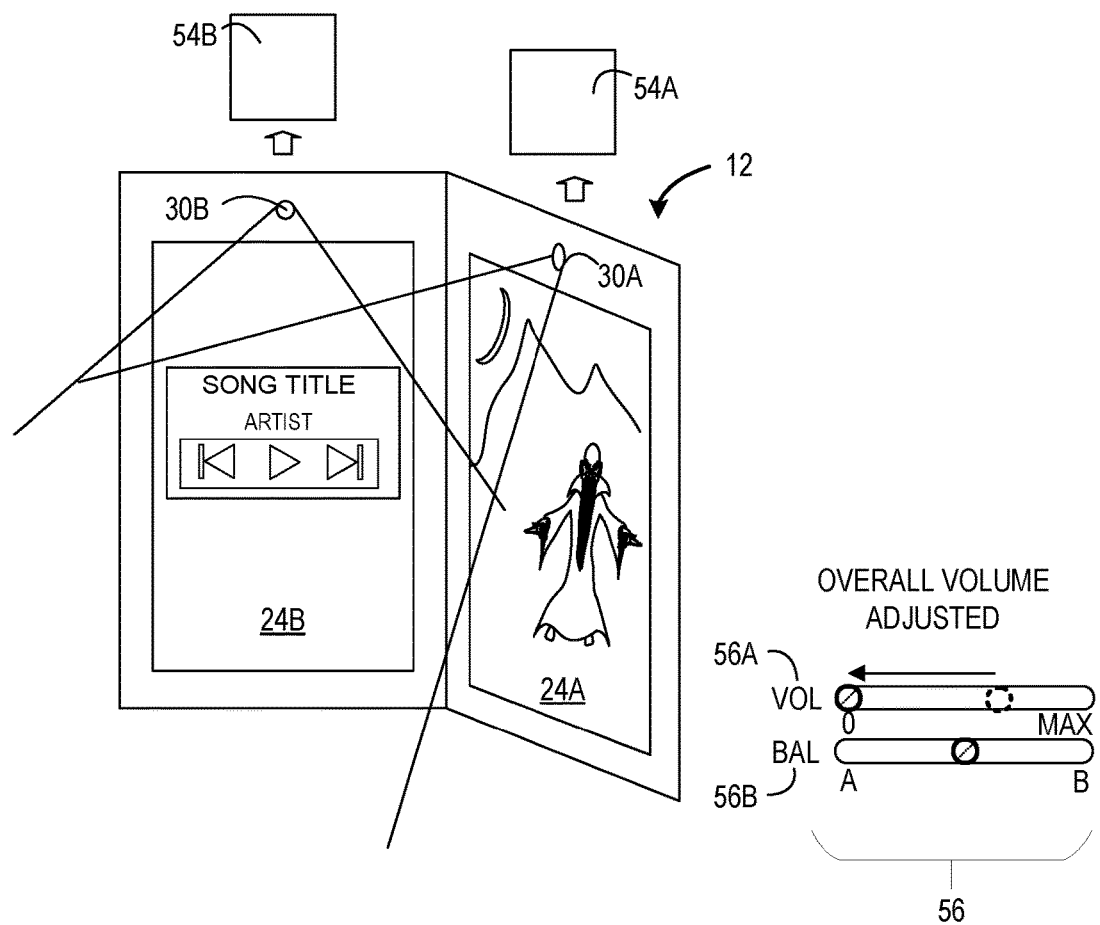
FIG. 6 is another schematic view illustrating adjustment of audio parameters based on facial detection (in this case, lack thereof), using the mobile computing device of FIG. 1.

FIG. 6 illustrates an example where the user has moved away from the mobile computing device 12 and is not viewing the first and second display 24A and 24B. As shown, as the user is not in front of the mobile computing device 12, the first and second cameras 30A and 30B will capture first and second images 54A and 54B that do not include the user. Thus, the result of the face detection from the face detection module 48 will indicate that no face was detected in front of the first and display displays 24A and 24B. As the user is not currently viewing and is not engaged with content of either display, the overall volume may be decreased in one configuration. In this configuration, the processor 16 is configured to decrease the overall audio volume setting 56A based on the result of the face detection indicating that no face was detected in front of the first display 24A and the second display 24B.

Figure 7:
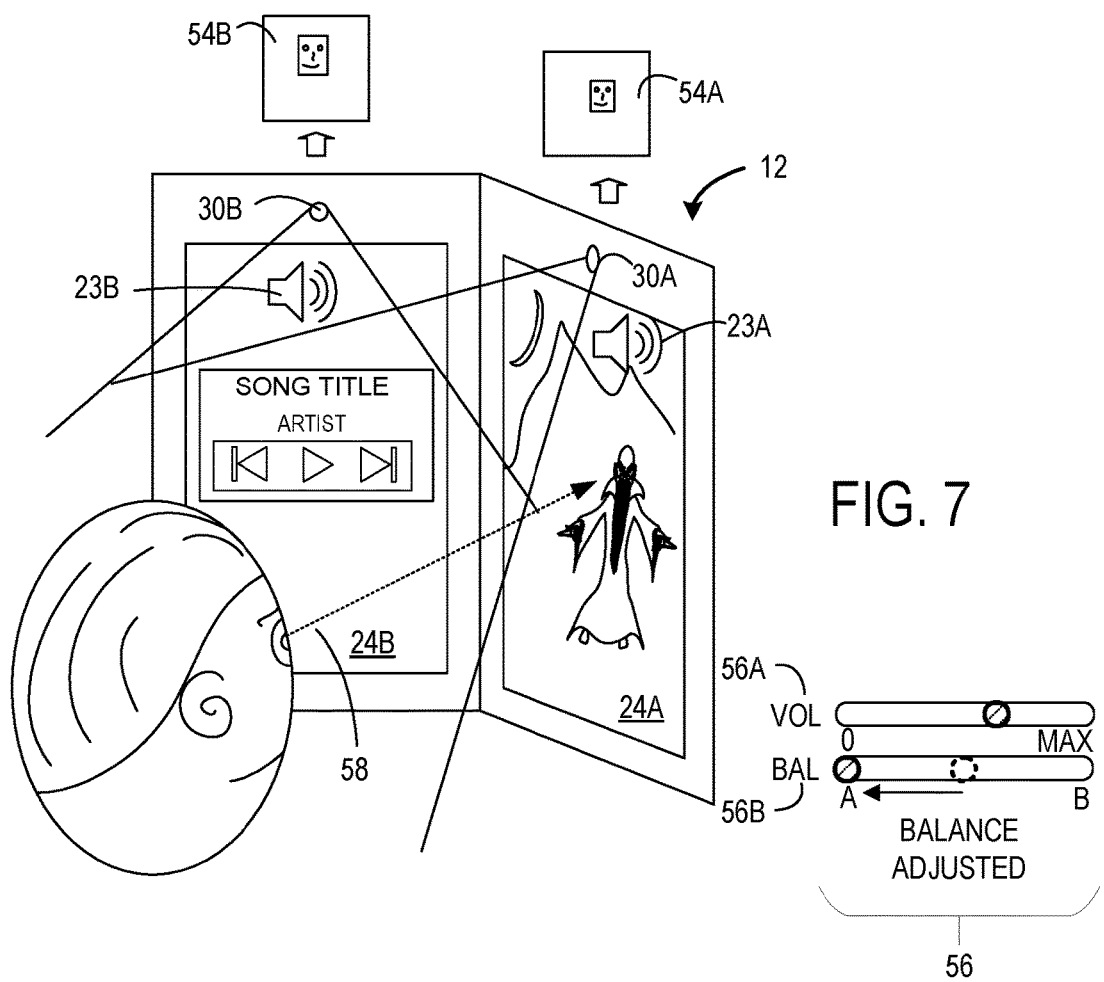
FIG. 7 is another schematic view illustrating adjustment of audio parameters based on facial detection and relative angular displacement between the first and second parts of the housing of the mobile computing device of FIG. 1, additionally using gaze angle estimation.

FIG. 7 illustrates another method for determining which display has the user focus. In this example, the face detection module 48 is configured to compute a gaze angle estimation 58 for the user by performing image processing on the first and second images 54A and 54B and comparing a position of eyes of the user in each of the first and second images 54A and 54B, taking into account the relative angular displacement (current angular orientation 52) of the first part 14A and the second part 14B detected by the sensor 20. As discussed previously, the current angular orientation 52 is calculated and updated by the orientation module 42 based on sensor data received via the sensors 20, including data received from the IMUs 26A and 26B. The face detection module 48 may be configured to determine the position of the eyes of the user in the first and second images 54A and 54B by detecting the user's pupils in the images 54A and 54B via image processing methods. Based on the position of the eyes of the user in the first and second images 54A and 54B, and the current angular orientation 52 between the first and second parts 14A and 14B of the housing 14 which include the first and second forward facing cameras 30A and 30B, the face detection module 48 executed by the processor 16 estimates a gaze angle 58 of the user's eyes using stereoscopic techniques.

In the example illustrated in FIG. 7, the result of the face detection from the face detection module 48 includes the gaze angle estimation 58 calculated as discussed above. Additionally, the processor 16 is configured to determine the user focused display based on the gaze angle estimation 58. That is, based on the gaze angle estimation 58, the processor 16 is configured to determine whether the user is currently looking at the first display 24A or the second display 24B. In the example illustrated in FIG. 7, the result of the face detection includes a gaze angle estimation indicating that the user is currently looking at and engaged with the content of the first display 24A. Thus, the processor 16 determines that the first display 24A is the user focused display in this example. As discussed previously, the processor 16 is configured to adjust a volume balance setting such that the audio stream of the graphical user interface element presented on the display currently being viewed by the user has a higher volume relative to the audio stream of the graphical user interface element presented on the display that is not currently being viewed by the user. In the example of FIG. 7, the first display 24A is currently the user focused display. Thus, the processor 16 is configured to adjust the volume balance setting 56B to increase a relative volume of an audio stream associated with a user focused display, which is the first audio stream 23A in this example.

Figure 8:
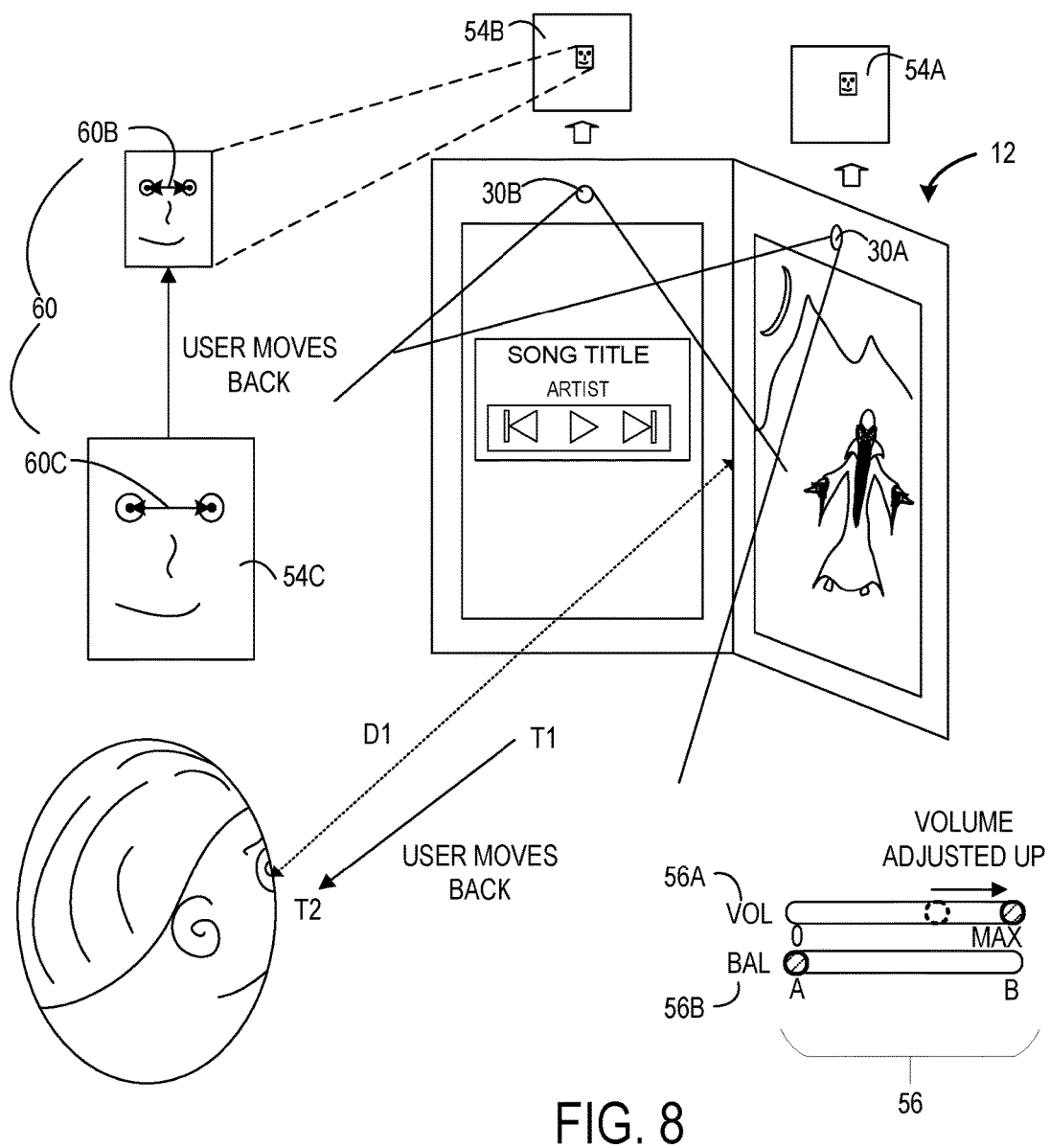
FIG. 8 is another schematic view illustrating adjustment of audio parameters based on facial detection, gaze angle, and relative angular displacement between the first and second parts of the housing of the mobile computing device of FIG. 1, additionally using a detected distance of the user's face from the mobile computing device.

FIG. 8 illustrates a technique for determining a distance between the user and the mobile computing device 12 based on image analysis. As discussed previously, first and second images 54A and 54B are captured by the first and second forward facing cameras 30A and 30B, and sent to the face detection module 48. The face detection module 48 may be configured to perform processing and analysis on the first and second image 54A and 54B to determine locations of the user's pupils in the images. In the example illustrated in FIG. 8, the face detection module 48 executed by the processor is further configured to calculate an interpupillary distance estimation 60 included in the result of the face detection. The face detection module 48 may estimate the interpupillary distance by measuring a pixel distance in the image between two detected pupils. For example, the image 54C was captured by the second forward facing camera 30B at a time T1 when the user was closer to the mobile computing device 12, and the second image 54B was taken at time T2 when the user was father away from the mobile computing device 12. Thus, the user's face in the image 54C will appear to be larger than in the second image 54B due to the user being closer to the second forward facing camera 30B. As the user's face in the image 54C is larger than in the second image 54B, the measured pixel distance in the images between the user's pupils in the image 54C will also be larger than in the second image 54B. Thus, the face detection module 48 calculates the interpupillary distance estimation 60C for the image 54C that is larger than the interpupillary distance estimation 60B for the second image 54B. Thus, it will be appreciated that the user's physical distance from the mobile computing device 12 will predictably affect the interpupillary distance estimation 60.

The processor 16 is configured to determine a distance D1 between the user and the mobile computing device 12 based on the interpupillary distance estimation 60. As discussed above, the user's distance D1 from the mobile computing device 12 will predictable affect the measured pupillary distance in the images captured by the forward facing cameras 30A and 30B. Thus, the distance D1 may be determined based on the interpupillary distance estimation 60 calculated by the face detection module 48. Additionally, as the user gets farther away from the mobile computing device 12, the overall audio volume may need to be increased to maintain the user's experience of the content presented via the first and second displays 24A and 24B. In one example, the processor 16 is further configured to adjust the overall audio volume setting 56A based on the determined distance D1. In the example illustrated in FIG. 8, the user has moved backwards away from the mobile computing device 12. Thus, as the determined distance D1 has increased, the processor 16 increases the overall audio volume setting 56A such that both the first and second audio streams 23A and 23B for the first and second graphical user interface elements displayed on the first and second displays 24A and 24B are played at a higher volume via the speakers 21A and 21B.

According to another implementation, the processor 16 may be configured to adjust a parameter of audio played back on the first speaker 21A and the second speaker 21B based upon the detected relative angular displacement between the first part 14A and second part 14B of the housing 14 sensed by a sensor such as the hinge angle sensor coupled to the hinge or a pair of inertial measurement units 26A, 26B respectively positioned in each of the first and second parts of the housing 14. In this implementation, the user may select a virtual or physical button on the mobile computing device 12 to enter an audio control mode according to which hinge angle variation functions as an input to control an audio parameter. In one example, the parameter adjusted may be an overall volume of the audio played back on the first speaker 21A and the second speaker 21B. Thus, in the audio control mode the device 12 may display GUI control 27A for example, and allow the user to control GUI control 27A by adjusting the hinge angle. As a user opens (or closes) the device wider (or narrower) and increases (or decreases) the relative angular displacement between the displays, the volume may correspondingly be increased (or decreased). In addition, in the audio control mode the device may display GUI control 27B and the user may control the GUI control 27B by adjusting the hinge angle. For example, when used in the mixed output mode described above, the parameter may be a volume balance of a first audio stream associated with a graphical user interface element displayed on the first display 14 and a second audio stream of the audio played back on the first speaker 21A and the second speaker 21B. Thus, a user may widen and narrow the angle between the first part 14A and second part 14B of the housing 14 in the audio control mode to correspondingly increase the proportional volume of the content on the right display 24A or left display 24B. When used in the parallel output mode, the parameter adjusted may be a balance of the audio played back on the first speaker 21A and the second speaker 21B. With this feature, the user may open and close the device to adjust the hinge angle and cause the balance to shift from the left speaker 21B to right speaker 21A.

Although in the above implementations a single processor 16 is provided to execute computing program 38 to control the audio processing, it will be appreciated that the first part and the second part of the mobile computing device 12 may include separate processors. When separate processors are provided, application 40A may be executed on a processor of the first part and application 40B may be executed on a processor of the second part. In this implementation, in the parallel output mode, the audio stream from application 40A is generated by the processor associated with the first part of the housing and output on the first speaker mounted in the first part of the housing. Likewise, the audio stream from application 40B is generated by the processor in the second part of the housing and output on the second speaker mounting in the second part of the housing.

Further, although the above implementations have been described as outputting audio to a first speaker and a second speaker, it will be appreciated that the implementations also may be used with headphones. In this case, the parallel output mode and mixed output mode audio may be outputted to a user's headphones via a wireless connection or a headphone jack provided in either of the first or second parts of the housing. In the parallel output mode, the left channel may reproduce the left display audio and the right channel may reproduce the right display audio. In the mixed audio output mode, the audio from each display may be played over both channels, according to the volume balance setting and overall volume setting.

Figure 9:
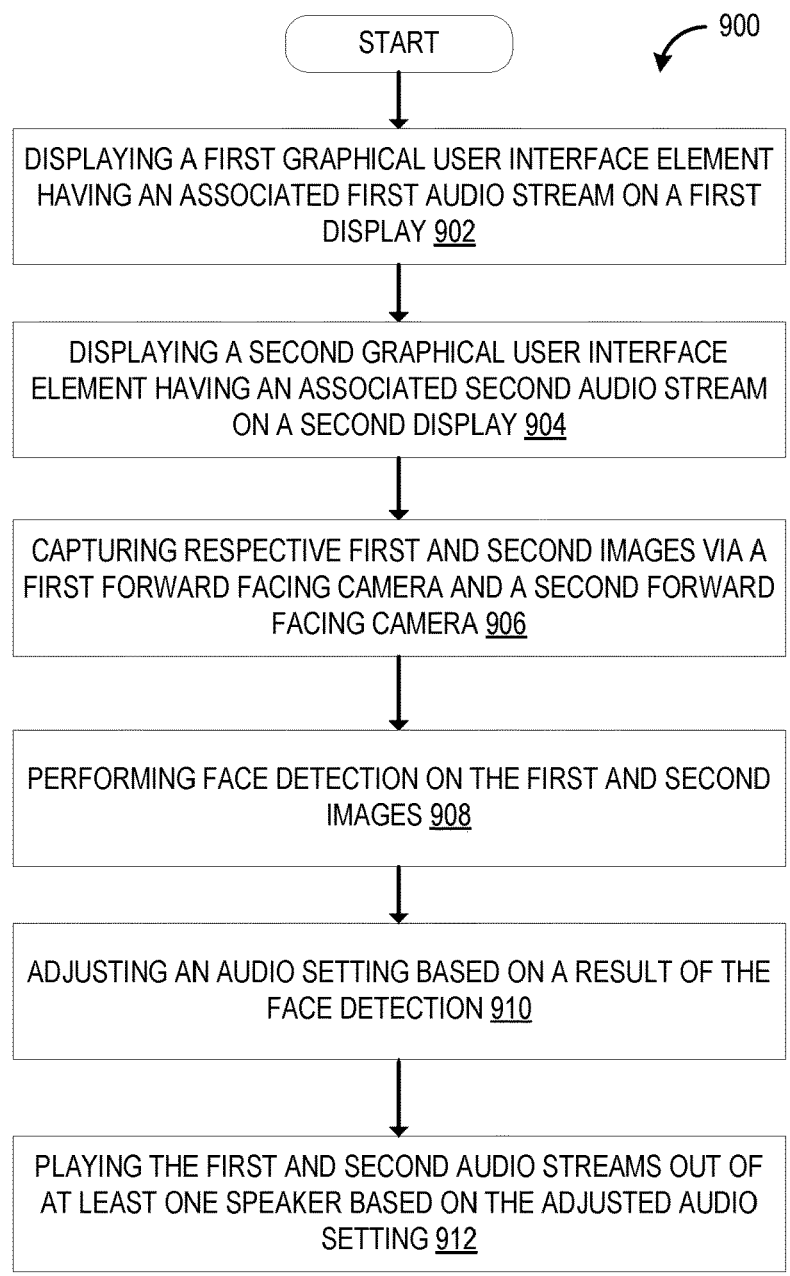
FIG. 9 shows an example method for adjusting audio parameters based on facial detection.

FIG. 9 shows an example computer-implemented method 900 for adjusting audio parameters based on facial detection. At step 902, the method 900 may include displaying a first graphical user interface element having an associated first audio stream on a first display included in a first part of a housing of a mobile computing device. The mobile computing device 12 includes the housing 14 configured to internally house various electronic components of the example mobile computing device 12, including the processor 16, volatile storage device 18, and non-volatile storage device 22. Additionally, the housing 14 may provide structural support for the displays 24, speakers 21, and the sensor devices 20. In one example, the first graphical user interface element is a game application 40A that is outputting audio of the first audio stream 23A, although other application types are contemplated.

At step 904, the method 900 may include displaying a second graphical user interface element having an associated second audio stream on a second display included in a second part of the housing, wherein the first part and the second part are coupled by a hinge configured to permit the first and second displays to rotate between angular orientations from a face-to-face angular orientation to a back-to-back angular orientation. In one example, the second graphical user interface element is a music application 40B that is outputting audio of the second audio stream 23B. In another example, the first and second graphical user interface elements 40A and 40B may be included in a single application that is being displayed across both the first and second displays 24A and 24B.

At step 906, the method 900 may include capturing respective first and second images via a first forward facing camera included in the first part of the housing and a second forward facing camera included in the second part of the housing. In one example, the forward facing cameras 30A and 30B include RGB cameras. However, it will be appreciated that other types of cameras may also be included in the forward facing cameras 30A and 30B. The first and second images captured by the first and second forward facing cameras are sent to the face detection module 48 for processing.

At step 908, the method 900 may include performing face detection on the first and second images. In one example, performing face detection includes determining whether a face is detected in the first and second images. In another example performing face detection includes determining a gaze angle estimation for the user. For example, the face detection module 48 may be configured to determine the position of the eyes of the user in the first and second images 54A and 54B by detecting the user's pupils in the images 54A and 54B via image processing methods. Based on the position of the eyes of the user in the first and second images 54A and 54B, and the current angular orientation 52 between the first and second parts 14A and 14B of the housing 14 which include the first and second forward facing cameras 30A and 30B, the face detection module 48 executed by the processor 16 estimates a gaze angle 58 of the user's eyes using stereoscopic techniques.

At step 910, the method 900 may include adjusting an audio setting based on a result of the face detection. In one example, the audio setting includes an overall audio volume setting for the first and second audio streams. In another example, the audio setting includes a volume balance setting that controls the proportional mix of audio between the first and second audio streams. The audio setting may be adjusted based on the result of the face detection, including whether a face was detected in the first and second images, a gaze angle estimation for the user, and/or an IPD estimation for the user.

At step 912, the method 900 may include playing the first and second audio streams out of at least one speaker mounted in the housing based on the adjusted audio setting. Typically, the audio is mixed into a stereo signal and emitted from speakers 21A, 21B as stereo audio. Alternatively, the audio may be mixed to a monoaural signal emitted both speakers 21A, 21B, and in yet another implementation, the application 40A may emit its audio from speaker 21A and application 40B may emit its audio from speaker 21B.

Figure 10:
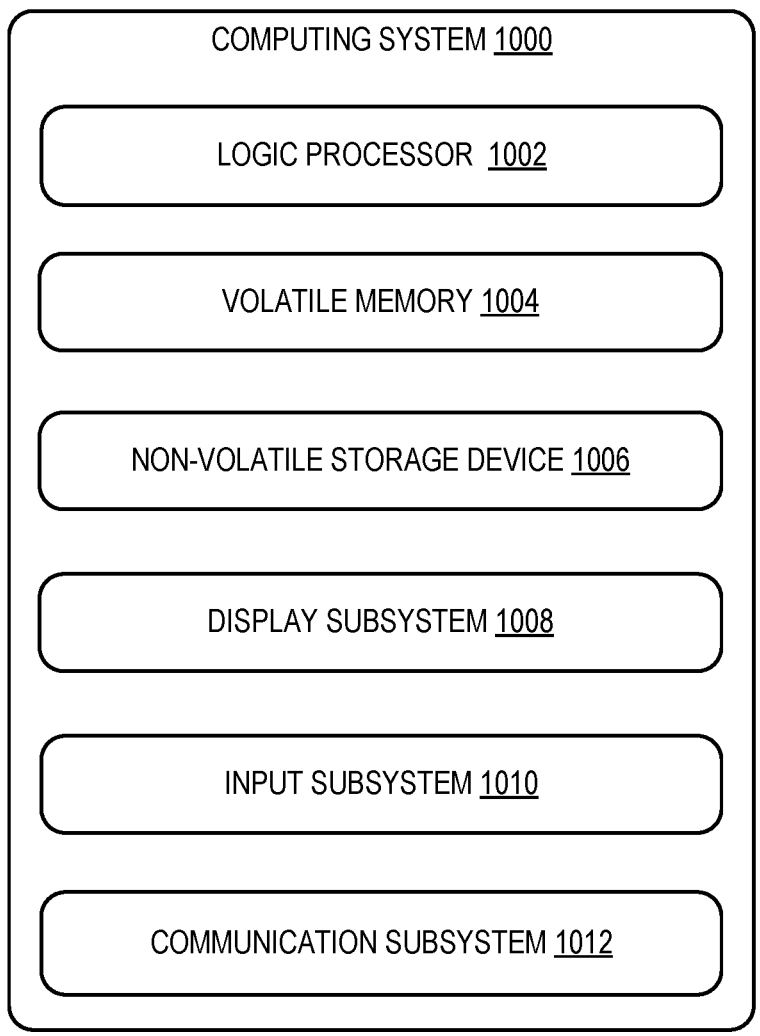
FIG. 10 shows an example computing system according to an embodiment of the present description.

FIG. 10 schematically shows a non-limiting embodiment of a computing system 1000 that can enact one or more of the methods and processes described above. Computing system 1000 is shown in simplified form. Computing system 1000 may embody the mobile computing device 12 of FIG. 1. Computing system 1000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, inertial measurement unit, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

The following paragraphs provide additional support for the claims of the subject application. One aspect provides a mobile computing device comprising a housing having a first part and a second part, the first part including a first display and a first forward facing camera, and the second part including a second display and a second forward facing camera, wherein the first part and the second part are coupled by a hinge configured to permit the first and second displays to rotate between angular orientations from a face-to-face angular orientation to a back-to-back angular orientation, a sensor mounted in the housing and configured to measure a relative angular displacement between the first and second parts of the housing, at least one speaker mounted in the housing, and a processor mounted in the housing and configured to display a first graphical user interface element having an associated first audio stream on the first display and to display a second graphical user interface element having an associated second audio stream on the second display, wherein the first and second forward facing cameras are configured to capture respective first and second images, and the processor is configured to perform face detection on the first and second images, adjust an audio setting based on a result of the face detection, and play the first and second audio streams out of the at least one speaker based on the adjusted audio setting. In this aspect, additionally or alternatively, the audio setting may include a volume balance setting that controls the proportional mix of audio between the first and second audio streams. In this aspect, additionally or alternatively, the processor may be configured to determine which display has a user focus, and adjust the volume balance setting to increase a relative volume of an audio stream associated with a user focused display. In this aspect, additionally or alternatively, the result of the face detection may include a gaze angle estimation, and the processor may be configured to determine the user focused display based on the gaze angle estimation. In this aspect, additionally or alternatively, the gaze angle estimation may be computed by performing image processing on the first and second images and comparing a position of eyes of the user in each of the first and second images, taking into account the relative angular displacement of the first part and the second part detected by the sensor. In this aspect, additionally or alternatively, the processor may be further configured to determine whether the result of the face detection detected a face in the first image captured by the first camera and not in the second image, and if so, then determine that the first display is the user focused display. In this aspect, additionally or alternatively, the processor may be further configured to determine whether the result of face detection detected a face in the second image captured by the second camera and not in the first image, and if so, then determine that the second display is the user focused display. In this aspect, additionally or alternatively, the processor may be configured to detect which display has user focus by determining that the relative angular displacement is greater than a predetermined threshold via the sensor, and responsive to determining that the relative angular displacement is greater than the predetermined threshold, decrease a relative volume of the display that is not the user focused display. In this aspect, additionally or alternatively, the predetermined threshold may be 180 degrees. In this aspect, additionally or alternatively, the audio setting may include an overall audio volume setting for the first and second audio streams. In this aspect, additionally or alternatively, the processor may be configured to decrease the overall audio volume setting based on the result of the face detection indicating that no face was detected in front of the first display and the second display. In this aspect, additionally or alternatively, the result of the face detection may include an interpupillary distance estimation, and the processor may be configured to determine a distance between the user and the mobile computing device based on the interpupillary distance estimation, and adjust the overall audio volume setting based on the determined distance. In this aspect, additionally or alternatively, the at least one speaker may be a first speaker in the first part of the housing, and the second part of the housing includes a second speaker.

Another aspect provides a mobile computing device comprising a housing having a first part and a second part, the first part including a first display and a first forward facing camera, and the second part including a second display and a second forward facing camera, wherein the first part and the second part are coupled by a hinge configured to permit the first and second displays to rotate between angular orientations from a face-to-face angular orientation to a back-to-back angular orientation, at least one speaker mounted in the housing, a sensor mounted in the housing and configured to detected relative angular displacement between the first and second parts of the housing, and a processor configured to adjust a parameter of audio played back on the at least one speaker based upon the detected relative angular displacement. In this aspect, additionally or alternatively, the parameter adjusted may be an overall volume of the audio played back on the at least one speaker. In this aspect, additionally or alternatively, the audio may include a first audio stream and a second audio stream, and the parameter adjusted may be a volume balance of the first audio stream associated with a graphical user interface element displayed on the first display and the second audio stream associated with a graphical user interface element displayed on the second display. In this aspect, additionally or alternatively, the at least one speaker may be a first speaker in a first part of the housing, and the second part of the housing may include a second speaker. In this aspect, additionally or alternatively, the parameter adjusted may be a balance of the audio played back on the first speaker and the second speaker. In this aspect, additionally or alternatively, the sensor may be a hinge angle sensor coupled to the hinge. In this aspect, additionally or alternatively, the sensor may include a pair of inertial measurement units respectively positioned in each of the first and second parts of the housing.

Another aspect provides a method comprising displaying a first graphical user interface element having an associated first audio stream on a first display included in a first part of a housing of a mobile computing device, displaying a second graphical user interface element having an associated second audio stream on a second display included in a second part of the housing, wherein the first part and the second part are coupled by a hinge configured to permit the first and second displays to rotate between angular orientations from a face-to-face angular orientation to a back-to-back angular orientation, capturing respective first and second images via a first forward facing camera included in the first part of the housing and a second forward facing camera included in the second part of the housing, performing face detection on the first and second images, adjusting an audio setting based on a result of the face detection, and playing the first and second audio streams out of at least one speaker mounted in the housing based on the adjusted audio setting.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device comprising:
a housing having a first part and a second part, the first part including a first display and a first forward facing camera, and the second part including a second display and a second forward facing camera, wherein the first part and the second part are coupled by a hinge configured to permit the first and second displays to rotate between angular orientations from a face-to-face angular orientation to a back-to-back angular orientation;
a sensor mounted in the housing and configured to measure a relative angular displacement between the first and second parts of the housing;
at least one speaker mounted in the housing; and
a processor mounted in the housing and configured to display a first graphical user interface element having an associated first audio stream on the first display and to display a second graphical user interface element having an associated second audio stream on the second display;
wherein the first and second forward facing cameras are configured to capture respective first and second images; and
the processor is configured to perform face detection on the first and second images, adjust an audio setting based on a result of the face detection, and play the first and second audio streams out of the at least one speaker based on the adjusted audio setting.

2. The mobile computing device of claim 1, wherein the audio setting includes a volume balance setting that controls a volume balance between the first and second audio streams.

3. The mobile computing device of claim 2, wherein the processor is configured to determine which display has a user focus, and adjust the volume balance setting to increase a relative volume of an audio stream associated with a user focused display.

4. The mobile computing device of claim 3, wherein the result of the face detection includes a gaze angle estimation, and the processor is configured to determine the user focused display based on the gaze angle estimation.

5. The mobile computing device of claim 4, wherein the gaze angle estimation is computed by performing image processing on the first and second images and comparing a position of eyes of the user in each of the first and second images, taking into account the relative angular displacement of the first part and the second part detected by the sensor.

6. The mobile computing device of claim 3, wherein the processor is further configured to determine whether the result of the face detection detected a face in the first image captured by the first camera and not in the second image, and if so, then determine that the first display is the user focused display.

7. The mobile computing device of claim 3, wherein the processor is further configured to determine whether the result of face detection detected a face in the second image captured by the second camera and not in the first image, and if so, then determine that the second display is the user focused display.

8. The mobile computing device of claim 3, wherein
the processor is configured to detect which display has user focus by determining that the relative angular displacement is greater than a predetermined threshold via the sensor; and
responsive to determining that the relative angular displacement is greater than the predetermined threshold, decrease a relative volume of the display that is not the user focused display.

9. The mobile computing device of claim 3, wherein the predetermined threshold is 180 degrees.

10. The mobile computing device of claim 1, wherein the audio setting includes an overall audio volume setting for the first and second audio streams.

11. The mobile computing device of claim 10, wherein the processor is configured to decrease the overall audio volume setting based on the result of the face detection indicating that no face was detected in front of the first display and the second display.

12. The mobile computing device of claim 10, wherein the result of the face detection includes an interpupillary distance estimation, and the processor is configured to determine a distance between the user and the mobile computing device based on the interpupillary distance estimation, and adjust the overall audio volume setting based on the determined distance.

13. The mobile computing device of claim 1, wherein the at least one speaker is a first speaker in the first part of the housing, and the second part of the housing includes a second speaker.

14. A mobile computing device comprising:
a housing having a first part and a second part, the first part including a first display and a first forward facing camera, and the second part including a second display and a second forward facing camera, wherein the first part and the second part are coupled by a hinge configured to permit the first and second displays to rotate between angular orientations from a face-to-face angular orientation to a back-to-back angular orientation;
at least one speaker mounted in the housing;
a sensor mounted in the housing and configured to detected relative angular displacement between the first and second parts of the housing;
a processor configured to adjust a parameter of audio played back on the at least one speaker based upon the detected relative angular displacement; and
wherein the audio includes a first audio stream and a second audio stream, and the parameter adjusted is a volume balance of the first audio stream associated with a graphical user interface element displayed on the first display and the second audio stream associated with a graphical user interface element displayed on the second display.

15. The mobile computing device of claim 14, wherein the parameter adjusted is an overall volume of the audio played back on the at least one speaker.

16. The mobile computing device of claim 14, wherein the at least one speaker is a first speaker in a first part of the housing, and the second part of the housing includes a second speaker.

17. The mobile computing device of claim 16, wherein the parameter adjusted is a balance of the audio played back on the first speaker and the second speaker.

18. The mobile computing device of claim 14, wherein the sensor is a hinge angle sensor coupled to the hinge.

19. A method comprising:
displaying a first graphical user interface element having an associated first audio stream on a first display included in a first part of a housing of a mobile computing device;
displaying a second graphical user interface element having an associated second audio stream on a second display included in a second part of the housing, wherein the first part and the second part are coupled by a hinge configured to permit the first and second displays to rotate between angular orientations from a face-to-face angular orientation to a back-to-back angular orientation;
capturing respective first and second images via a first forward facing camera included in the first part of the housing and a second forward facing camera included in the second part of the housing;
performing face detection on the first and second images;
adjusting an audio setting based on a result of the face detection; and
playing the first and second audio streams out of at least one speaker mounted in the housing based on the adjusted audio setting.

* * * * *